US012577061B2

(12) United States Patent
 Itoh et al.

(10) Patent No.: US 12,577,061 B2
(45) Date of Patent: Mar. 17, 2026

(54) CONVEYANCE DEVICE

(71) Applicant: ITOH DENKI CO., LTD., Kasai (JP)

(72) Inventors: Kazuo Itoh, Kasai (JP); Toshiyuki Tachibana, Kasai (JP); Akira Takanaga, Kasai (JP); Mitsuo Inoue, Kasai (JP); Shin Asada, Kasai (JP)

(73) Assignee: Itoh Denki Co., Ltd., Kasai (JP)

( * ) Notice: Subject to any disclaimer, the term of this patent is extended or adjusted under 35 U.S.C. 154(b) by 511 days.

(21) Appl. No.: 18/033,686

(22) PCT Filed: Oct. 19, 2021

(86) PCT No.: PCT/JP2021/038565
 § 371 (c)(1),
 (2) Date: Apr. 25, 2023

(87) PCT Pub. No.: WO2022/091863
 PCT Pub. Date: May 5, 2022

(65) Prior Publication Data
 US 2023/0416011 A1 Dec. 28, 2023

(30) Foreign Application Priority Data
 Oct. 26, 2020 (JP) ................................. 2020-178773

(51) Int. Cl.
 B65G 43/10 (2006.01)
(52) U.S. Cl.
 CPC .................................... B65G 43/10 (2013.01)
(58) Field of Classification Search
 CPC .................................................... B65G 43/10
 See application file for complete search history.

(56) References Cited

U.S. PATENT DOCUMENTS

| | | | | |
|---|---|---|---|---|
| 3,927,757 A | * | 12/1975 | Fauth ..................... | B65G 43/08 |
| | | | | 198/573 |
| 8,757,363 B2 | * | 6/2014 | Combs ................... | B65G 43/00 |
| | | | | 198/781.01 |

(Continued)

FOREIGN PATENT DOCUMENTS

| | | |
|---|---|---|
| JP | 2-226403 A | 9/1990 |
| JP | 4-260101 A | 9/1992 |

(Continued)

OTHER PUBLICATIONS

Supplementary Partial European Search Report, issued Oct. 24, 2024, in European Patent Application No. EP 21 88 5982.

(Continued)

*Primary Examiner* — Kyle O Logan
(74) *Attorney, Agent, or Firm* — Wood, Phillips, Katz, Clark & Mortimer

(57) ABSTRACT

A conveyance device capable of reducing the frequency of stopping. A plurality of conveyance units are connected to form a conveyance path. The conveyance unit includes a drive device that drives the conveyance unit, and an individual control device that controls the conveyance unit. The individual control device drives the conveyance unit when a specific drive condition is satisfied. The conveyance device includes a host control device that performs communication with the individual control device. The host control device includes a movement situation monitoring unit that monitors a movement situation of an actual object on the conveyance path, and when the conveyance unit on which a specific object is placed is stopped even in a situation where the specific object is movable on the basis of a state around the specific object, a correction operation to drive the conveyance unit is executed regardless of the drive condition.

16 Claims, 10 Drawing Sheets

(56) References Cited

U.S. PATENT DOCUMENTS

| | | | | | |
|---|---|---|---|---|---|
| 8,983,651 | B2 * | 3/2015 | Combs | ............... | G05B 19/4189 |
| | | | | | 700/230 |
| 2002/0084173 | A1 * | 7/2002 | Paquette | ................ | B65G 43/10 |
| | | | | | 198/781.06 |
| 2004/0003982 | A1 | 1/2004 | Tachibana et al. | | |
| 2004/0254674 | A1 | 12/2004 | Nojo et al. | | |
| 2009/0099686 | A1 | 4/2009 | Yoshikawa et al. | | |
| 2013/0213768 | A1 * | 8/2013 | Yokoya | .................. | B65G 43/08 |
| | | | | | 198/462.1 |
| 2014/0129026 | A1 * | 5/2014 | Scholler | ................. | B65G 47/52 |
| | | | | | 700/230 |
| 2014/0277700 | A1 * | 9/2014 | Maglaty | ................. | B65G 43/10 |
| | | | | | 700/230 |
| 2017/0101273 | A1 | 4/2017 | Itoh et al. | | |
| 2022/0024697 | A1 | 1/2022 | Itoh et al. | | |
| 2022/0171369 | A1 * | 6/2022 | Uriarte | .................... | H04L 12/40 |

FOREIGN PATENT DOCUMENTS

| | | | |
|---|---|---|---|
| JP | 2003-039283 | A | 2/2003 |
| JP | 2005-231745 | A | 9/2005 |
| JP | 2013-203532 | A | 10/2013 |
| JP | 2013-230914 | A | 11/2013 |
| WO | 2006/120783 | A1 | 11/2006 |
| WO | 2016/080362 | A1 | 8/2017 |
| WO | 2020203477 | A1 | 10/2020 |

OTHER PUBLICATIONS

International Search Report Issued Dec. 7, 2021 in International Patent Application No. PCT/JP2021/038565.
International Preliminary Report on Patentability and Written Opinion of the International Searching Authority, issued May 2, 2023, in International Patent Application No. PCT/JP2021/038565.

* cited by examiner

CONVEYANCE DEVICE

BACKGROUND OF THE INVENTION

Field of the Invention

The present invention relates to a conveyance device such as a conveyor device.

Background Art

As an embodiment of the conveyance device, a distributed control type conveyance device is known (Patent Document 1). In the distributed control, a plurality of conveyance units called zone conveyors are arranged in series or in branches to form a series of conveyance paths, and each conveyance unit has an independent drive motor (drive device). Each conveyance unit is provided with a load presence sensor. The load presence sensor is a sensor that detects whether there is an object on the conveyance unit. Each conveyance unit is provided with a control device called a zone controller. The control device incorporates a CPU and a storage unit, and the storage unit stores a computer program constituting a logic circuit (control circuit).

In the distributed control type conveyance device, each conveyance unit constitutes one zone, and the zones are connected.

Then, for example, when a predetermined drive condition that the object is present in the own zone (conveyance unit) and the object is not present in the downstream zone is satisfied, the drive motor of the own zone (conveyance unit) is activated to send the object to the downstream zone.

Specifically, when the condition that the load presence sensor in the own zone detects the object on the own zone (hereinafter, may be referred to as load presence sensor ON) and the load presence sensor in the downstream zone does not detect the object (hereinafter, may be referred to as load presence sensor OFF) is satisfied, the drive motor of the own zone (conveyance unit) is activated to send the object to the downstream zone.

The drive condition is not limited to the operation logic described above.

Patent Document 1: JP 2005-231745 A

Patent Document 2: JP 2013-230914 A

The conveyance device in the related art has a problem that the operation may be stopped for a long time.

For example, when there is an object in the own zone, the load presence sensor is ON, and the downstream zone is the load presence sensor OFF, the own zone (conveyance unit) is driven. However, when the load presence sensor performs erroneous detection such that the load presence sensor is OFF even though there is an object in the own zone, the zone is not driven.

When the failure of the load presence sensor is the cause of the stop, the zone is permanently stopped. When one zone is stopped, the zones on the upstream side are congested, and as a result, the entire conveyance device is stopped.

For other reasons, the conveyance device may be forced to stop.

An object of the present invention is to provide a conveyance device capable of reducing the frequency of stopping by paying attention to the above-described problems in the prior art.

SUMMARY OF THE INVENTION

An aspect to solve the above-described problems is a conveyance device including a plurality of conveyance units connected to form a conveyance path, the plurality of conveyance units each including: a drive device driving the conveyance unit; and an individual control device controlling the conveyance unit, the individual control device allowing the drive device to drive the conveyance unit when a specific drive condition is satisfied, the conveyance device including a host control device communicating with the individual control device, the host control device including a movement situation monitoring unit monitoring a movement situation of an actual object on the conveyance path, wherein when the conveyance unit having an specific object thereon is stopping even though surrounding conditions of the specific object show that the specific object is movable, a correction operation is executed regardless of the drive condition, the correction operation driving the conveyance unit according to a command from the host control device.

The individual control device is often provided for each conveyance unit, but it may control a plurality of conveyance units.

In the above-described aspect, it is preferable that the individual control devices exchange information on a destination of an object between each other to convey the object to a predetermined conveyance destination, the host control device includes a movement path estimation unit that estimates a movement path of an object, and when a specific object is about to deviate from the movement path estimated by the movement path estimation unit, a correction operation is executed in preference to the information on the destination exchanged between the individual control devices, the correction operation guiding the object to a path estimated by the movement path estimation unit.

According to the present aspect, the frequency of erroneous delivery of the object is reduced.

Another aspect to solve the above-described problems is a conveyance device including a plurality of conveyance units connected to form a conveyance path, the plurality of conveyance units each including: a drive device driving the conveyance unit; and an individual control device controlling the conveyance unit, the individual control device allowing the drive device to drive the conveyance unit when a specific drive condition is satisfied, the individual control devices exchanging information on a destination of the object between each other to convey the object to a predetermined conveyance destination, the conveyance device including a host control device communicating with the individual control devices, the host control device including: a movement path estimation unit estimating a movement path of the object; and a movement situation monitoring unit monitoring a movement situation of an actual object on the conveyance path, wherein when a specific object is about to deviate from the movement path estimated by the movement path estimation unit, a correction operation is executed in preference to the information on the destination exchanged between the individual control devices, the correction operation guiding the object to a path estimated by the movement path estimation unit.

According to the present aspect, the frequency of erroneous delivery of the object is reduced.

Another aspect to solve the above-described problems is a conveyance device including a plurality of conveyance units connected to form a conveyance path, the plurality of conveyance units each including: a drive device driving the conveyance unit; and an individual control device storing an individual program for operating the conveyance unit according to a predetermined operation logic, the conveyance device including a host control device communicating with the individual control device, the host control device including: an operation situation monitoring unit individually monitoring an operation state of each conveyance unit; and at least one of a desired operation storage unit storing a desired operation of the conveyance device and a desired operation estimation unit virtually executing a desired operation of the conveyance device, wherein when there is a prescribed difference in comparison of the desired operation of the conveyance device with an actual operation of the conveyance device obtained by the operation situation monitoring unit, a correction operation is executed in preference to the individual program, the correction operation being an operation close to the desired operation.

In each of the above-described aspects, it is preferable that when any of the correction operations is executed, a situation at the execution of the correction operation is recorded.

In each of the above-described aspects, it is preferable that any of the conveyance units is a roller conveyor, and a tangential force of the roller is 100 newtons or less.

It is preferable that the conveyance device includes a merging portion where a plurality of conveyance paths merge, and when each conveyance unit before the merging portion has an object at the same time, a priority order of which conveyance unit to bring its object into the merging portion is determined in advance.

It is preferable that the host control device stores a conveyance order of each object.

In the conveyance device of the present invention, the frequency of stopping is less than those in the related art.

DETAILED DESCRIPTION OF THE PREFERRED EMBODIMENTS

Hereinafter, embodiments of the present invention will be described.

Figure 1:
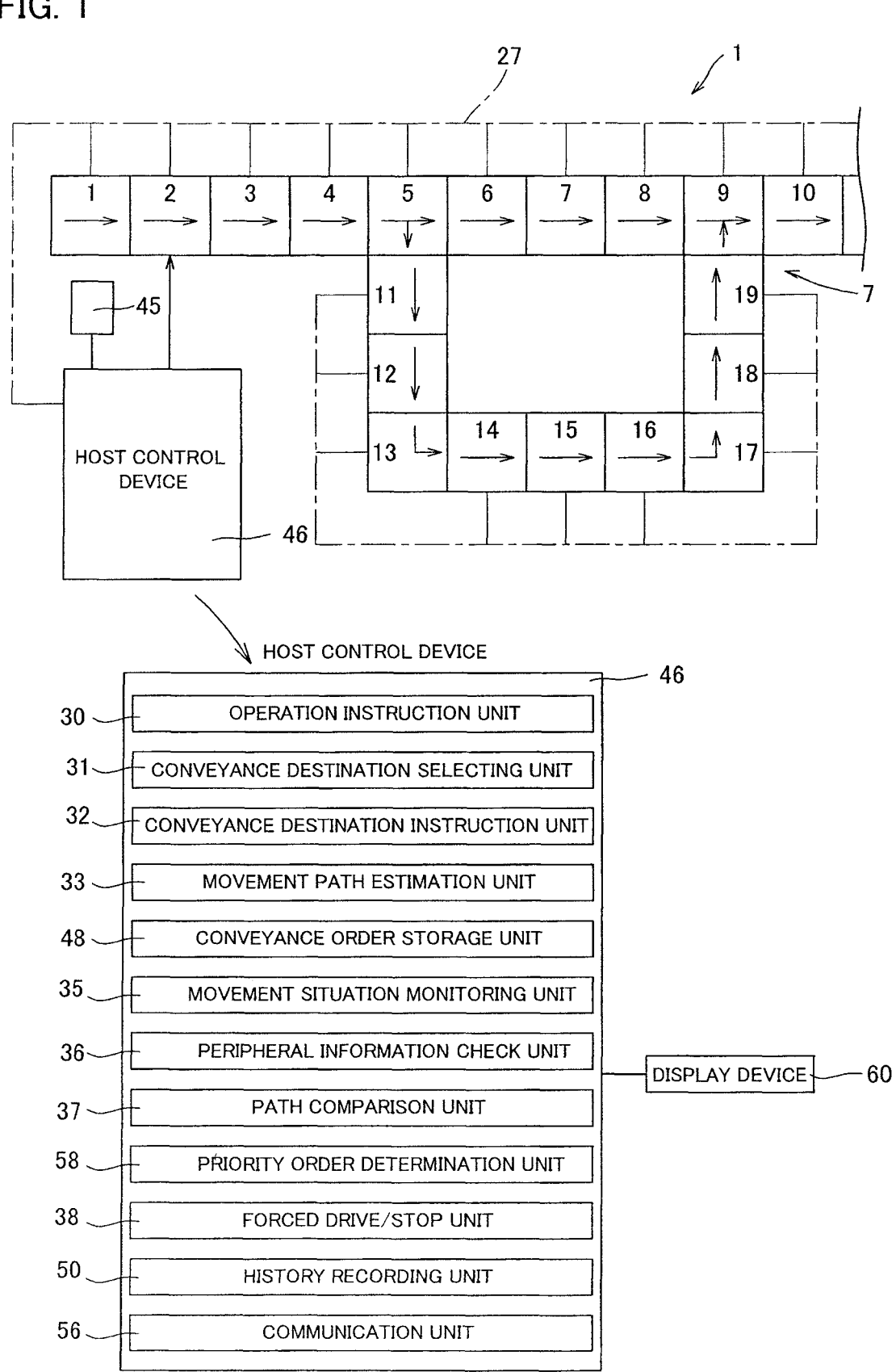
FIG. 1 is a block diagram of a layout of the conveyor device and the host control device according to a first embodiment of the present invention.

A conveyance device 1 of the present embodiment is a conveyor having a layout as illustrated in FIG. 1, and is a conveyor device in which a conveyance path 7 is branched, and there are a plurality of destination places and routes for conveying an object. The conveyance device 1 includes a host control device 46.

In the conveyance path 7 of the conveyance device 1, a linear portion is divided into a plurality of short zones. That is, in the conveyance device 1, the linear portion of the conveyance path 7 is constituted by connecting a plurality of linear conveying zones in series. The conveyance device 1 includes a plurality of conveying direction changing zones, and constitutes the branched conveyance path 7.

The conveyance device 1 is intended to convey an object having a substantially constant size such as a pallet, a container, and a tray, and each zone has a length so that at least one object can be placed on it.

One conveyance unit 2, 20 is disposed in each zone. In the conveyance unit 2, 20, a mechanical structure part and a zone controller 10 are integrated.

Figure 2:
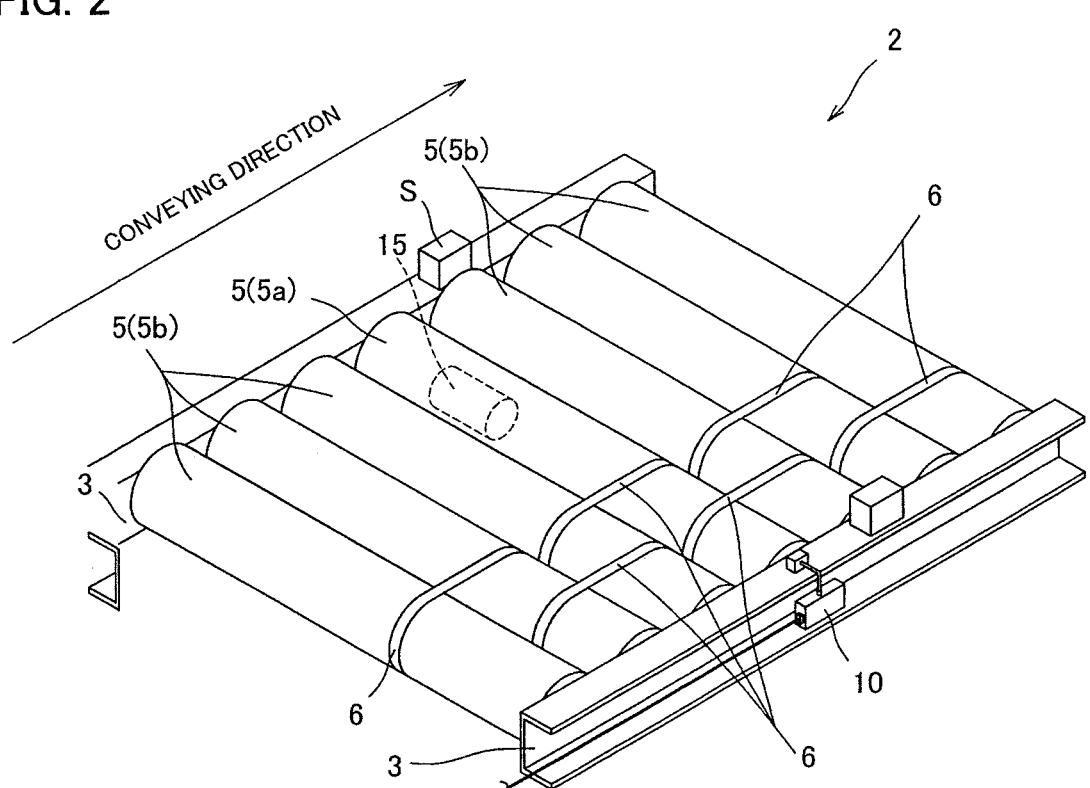
FIG. 2 is a perspective view of the conveyance unit constituting a linear conveying zone.
Figure 3:
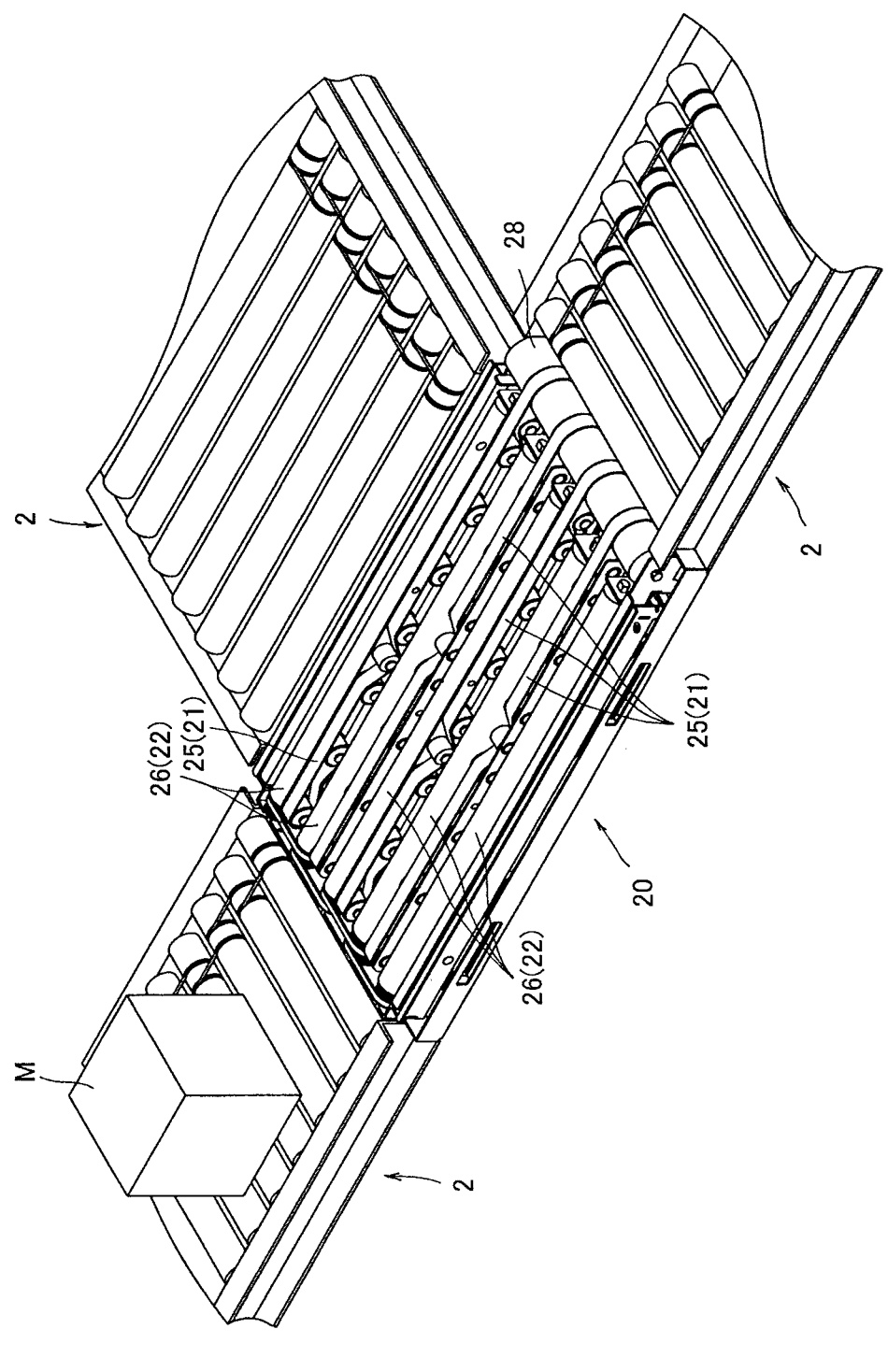
FIG. 3 is a perspective view of the vicinity of a conveying direction changing zone formed by the conveying direction changing device.

The conveyance unit 2 installed in the linear conveying zone is a zone conveyor as illustrated in FIG. 2. The conveyance unit 20 installed in the conveying direction changing zone is a transfer device as illustrated in FIG. 3.

The conveyance unit 2 is a short roller conveyor, and a conveying roller 5 includes a freely rotating follower roller 5b and a motor-incorporating roller 5a. In the present embodiment, there is only one motor-incorporating roller 5a, and the others are all follower rollers 5b that are connected by a transmission belt 6 to rotate. The motor-incorporating roller 5a incorporates a drive motor 15 as a drive device. The drive motor 15 has a function of outputting a pulse signal according to rotation. The same applies to the drive motors of the other motor-incorporating rollers.

Each conveyance unit 2 is provided with a load presence sensor S as illustrated in FIG. 2. The load presence sensor S is provided on a side frame 3.

The load presence sensor S detects whether or not an object is on the conveyance unit 2.

As the load presence sensor S, a photoelectric sensor can be used, and a light emitting element (not illustrated) such as a light emitting diode or an infrared diode is provided on the opposing side frame 3. As a result, when the object is conveyed, the light from the light emitting element is blocked off and an on (H level) signal is output, and when the conveyed object is not present, an off (L level) signal is output. In this manner, the load presence sensor S is turned on/off, and it is possible to detect that the object was conveyed to a predetermined position.

Note that the load presence sensor is not essential, and for example, a part or the whole of the conveyance device 1 can be constituted by a camera, and the position of the object and the conveyance situation are detected by video analysis.

Next, the conveying direction changing zone will be described. The conveyance unit 20 installed in the conveying direction changing zone is the transfer device as illustrated in FIG. 3. The conveyance unit 20 includes a direction changing mechanism that changes the conveying direction or the carry-in direction.

As illustrated in FIG. 3, the conveyance unit 20 includes a main conveyance conveyor 21, a sub conveyance conveyor 22, and a lifting and lowering device (not illustrated).

The main conveyance conveyor 21 of the conveyance unit 20 is a belt conveyor in which a plurality of thin belts 25 are arranged at regular intervals. The main conveyance conveyor 21 is driven by a drive motor (drive device) (not illustrated).

When an object M placed on the conveyance unit 20 is caused to travel straight, the main conveyance conveyor 21 is caused to protrude above the sub conveyance conveyor 22 by the lifting and lowering device (not illustrated), and a motor-incorporating roller 28 of the main conveyance conveyor 21 is driven to cause the belt 25 to travel.

In the case of discharging the object M placed on the conveyance unit 20 in the lateral direction, after the object is drawn into the main conveyance conveyor 21, the sub conveyance conveyor 22 is raised and the main conveyance conveyor 21 is lowered by the lifting and lowering device (not illustrated), the sub conveyance conveyor 22 is caused to protrude above the main conveyance conveyor 21, the motor-incorporating roller of the sub conveyance conveyor 22 is driven to rotate each conveying roller 26. The motor-incorporating roller of the sub conveyance conveyor 22 also includes a drive motor (drive device).

The load presence sensor S is also provided in the conveyance unit 20 (not illustrated). A zone controller (not illustrated) is also attached to the conveyance unit 20.

Each of the conveyance units 2, 20 has a low-load specification, and the maximum tangential force of the conveying roller 5, the conveying roller 26, and the belt 25 is 100 newtons or less. Therefore, even when the body of the worker is pinched, it does not lead to a serious accident.

In the conveyance device 1, a plurality of conveyance units 2, 20 are connected to form the conveyance path 7. The layout of the conveyance device 1, which is as illustrated in FIG. 1, includes the branched conveyance path 7.

Each zone has its individual address. For convenience, it is assumed that addresses 1 to 19 are assigned as illustrated in FIG. 1. In the present embodiment, the address of the first zone is 1, and the address of the second zone is 2. Hereinafter, addresses are sequentially assigned.

The address of each zone is stored in the zone controller 10 of each zone.

In FIG. 1, an arrow attached to each zone models the functions of the conveyance units 2, 20 in each zone, and the meaning of the arrow indicates the conveying direction. In the conveyance device 1, the conveyance unit 2 for straight traveling and the conveyance unit 20 for branching are used. That is, a straight arrow indicates the zone conveyor is a conveyance unit 2 for the linear conveying zone.

The branched arrow indicates the transfer device is a conveyance unit 20 for the conveying direction changing zone. The fifth zone and the ninth zone include a conveyance unit (transfer device) 20, and the other zones include a conveyance unit 2 for straight traveling.

As described above, each zone includes a zone controller 10 and a load presence sensor S. The zone controller 10 supplies power to a drive motor 15 (drive device) of the conveyance units 2, 20 in each zone, and drives and stops the drive motor 15 of the conveyance units 2, 20 in each zone.

Figure 4:
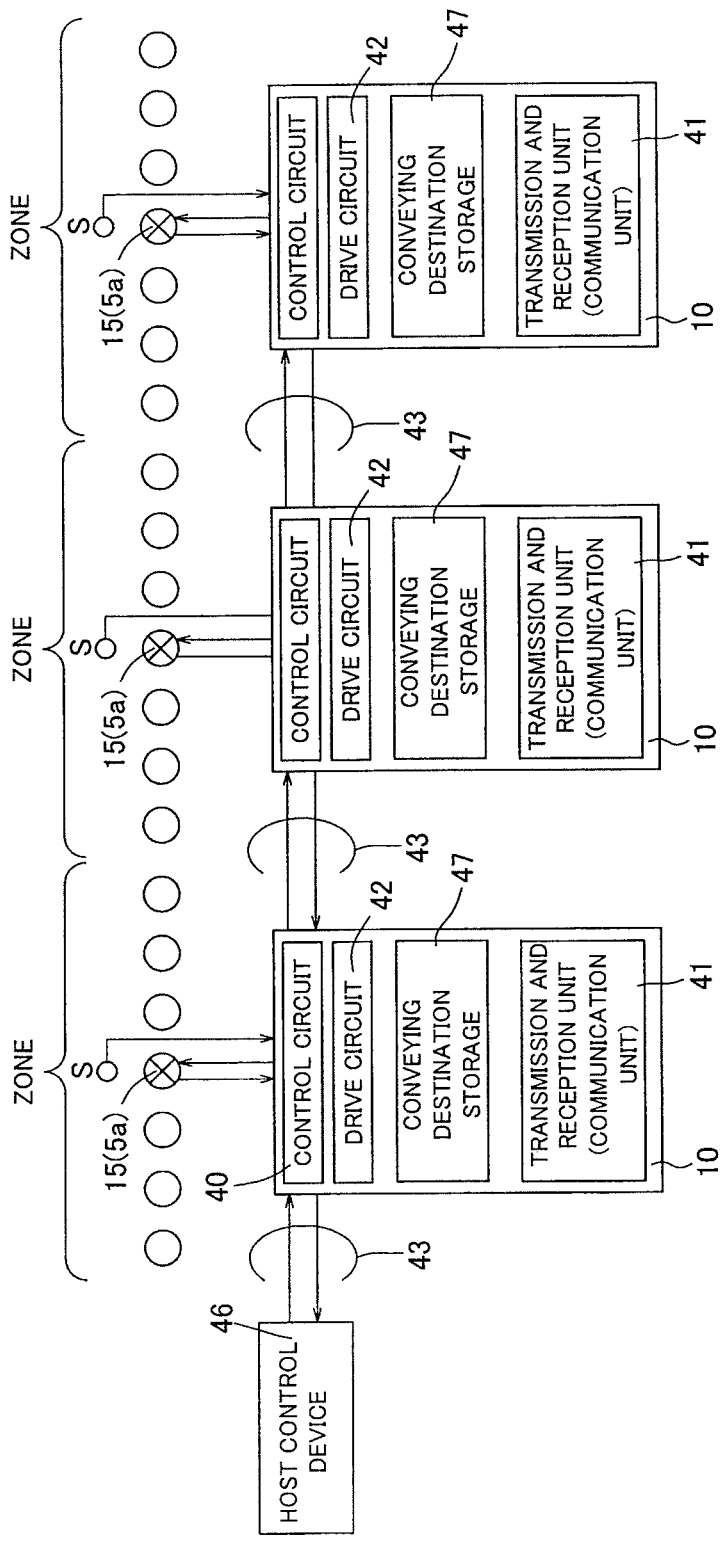
FIG. 4 is a block diagram of the zone controller and a circuit diagram illustrating a relationship between each zone controller and a host control device.

As illustrated in FIG. 4, the zone controller 10 is an individual control device having a control circuit 40 that individually controls the conveyance units 2, 20.

That is, as illustrated in FIG. 4, the zone controller 10 incorporates a drive circuit 42 that drives the drive motor 15.

The zone controller 10 includes the control circuit 40 (control unit) that controls the drive circuit 42. The control circuit 40 includes a memory (not illustrated), and an individual program for operating a drive device according to a certain operation logic is stored in the memory. The control circuit 40 operates the drive circuit 42 according to a predetermined control logic, and drives and stops the drive motor 15 (drive device).

That is, the conveyance unit 2, 20 are driven when a specific drive condition is satisfied according to a predetermined control logic.

Although the drive condition is not limited, there are a case where the object is discharged from the own zone to the downstream zone and a case where the object is introduced from the upstream zone.

The drive condition in the case of discharging the object from the own zone to the downstream zone is not limited, but for example, it is assumed that the own zone is in the load presence sensor ON state and the downstream side is in the load presence sensor OFF state.

In addition, even when the own zone is in the load presence sensor ON state and the downstream zone is driven, the own zone is driven.

The drive condition in the case of introducing the object from the upstream zone is not limited, but for example, it is assumed that the own zone is in the load presence sensor OFF state and the upstream side is in the load presence sensor ON state.

The zone controller 10 incorporates a conveyance destination storage member (conveying destination storage) 47 and a transmission and reception unit (communication unit) 41.

The conveyance destination storage member 47 is a memory, and functions as a conveying destination storage that temporarily stores conveyance destination information. Here, the "conveyance destination information" is a conveyance destination on the conveyance device 1, and is information including the above-described address. In addition, the transmission and reception unit 41 exchanges signals with the zone controllers 10 of the adjacent zones, and has a function as an information reception unit that receives conveyance destination information from the upstream zone, and a function as an information transmission unit that transmits the conveyance destination information to the downstream zone.

The zone controller (individual control device) 10 can also communicate with the host control device 46 via the transmission and reception unit (communication unit) 41. The zone controller (individual control device) 10 is also operated according to a command from the host control device 46. That is, the drive circuit 42 can be operated by a signal from the host control device 46 to drive and stop the drive motor 15 (drive device).

The zone controller 10 is provided in all the zones, and the adjacent zone controllers 10 are connected to each other by a signal line 43. Further, a signal of the load presence sensor S of each zone is input to corresponding zone controller 10.

Furthermore, all the zone controllers 10 and the host control device 46 are connected by a communication network 27, and communicate with each other.

In the present embodiment, one zone controller (individual control device) 10 is provided in each zone, but a plurality of zones may be controlled by one zone controller (individual control device).

In the conveyance device 1 of the present embodiment, an object identifying device 45 is installed in the first zone which is a start position. Specifically, the object identifying device 45 is a barcode reader.

The host control device 46 includes an operation instruction unit 30, a conveyance destination selecting unit 31, a conveyance destination instruction unit 32, a movement path estimation unit 33, a conveyance order storage unit 48, a movement situation monitoring unit 35, a peripheral information check unit 36, a path comparison unit 37, a priority order determination unit 58, a forced drive/stop unit 38, a history recording unit 50, and a communication unit 56. In addition, the host control device 46 includes a display device 60.

The operation instruction unit 30 instructs the start or stop of the entire conveyance device 1 as well as the start or stop of the conveyance units 2, 20, which should be controlled, of the individual zone controllers 10.

The conveyance destination selecting unit 31 determines a conveyance destination of each object.

The information read from the object identifying device 45 is sent to the host control device 46. The conveyance destination selecting unit 31 of the host control unit identifies the object from the information described in the barcode, and inquires a conveyance destination (destination place) of the object.

Further, the movement path of the object is determined by the movement path estimation unit 33, and the conveyance path is stored for each object.

Then, the conveyance destination instruction unit 32 transmits the address of the destination place to the zone controller 10 of the second zone, and inputs the address to the conveyance destination storage member 47 of the zone controller 10 of the second zone.

The conveyance destination information input to the conveyance destination storage member 47 is sequentially transmitted to the downstream zone controller 10 together with the conveyance of the object.

The conveyance order storage unit 48 stores the order in which each object is conveyed.

In the present embodiment, each zone controller 10 and the host control device 46 are connected by the communication network 27 to communicate with each other, and information is exchanged.

The information of the load presence sensor S and the information of the object on the zone are input from each zone controller 10 to the host control device 46 via the communication network 27.

The movement situation monitoring unit 35 monitors the current operation situation of the conveyance device 1 on the basis of the information obtained by the communication network 27.

That is, whether there is an object on each zone, what the object is, an operation state of each zone, and the like are monitored by the movement situation monitoring unit 35.

In the present embodiment, the movement situation monitoring unit 35 displays the layout of the conveyance device 1 on the display device 60, and further displays in which zone the object M is present. Further, a video image of the movement situation of the object M is displayed on the display device 60.

When the object is stopped due to some abnormality, the peripheral information check unit 36 checks the driving state of the zone in which the object is placed and the zones before and after the zone, as well as the presence or absence of the object.

The path comparison unit 37 compares the movement path determined by the movement path estimation unit 33 with a path along which the object is actually going to move.

When each conveyance unit before the merging portion has the object at the same time, the priority order determination unit 58 determines the priority order among conveyance units, such as from which unit the object is to be carried into the merging portion.

The forced drive/stop unit 38 transmits a signal to a specific zone via the communication unit to forcibly drive or stop the specific zone. That is, even when the drive condition is not satisfied, the specific zone is forcibly driven by the signal from the forced drive/stop unit 38. Conversely, even when the drive condition is satisfied, the specific zone is forcibly stopped by the signal from the forced drive/stop unit 38.

The forced drive/stop unit 38 transmits a signal from the host control device 46 to perform an operation (correction operation) different from the control logic of the individual program of each zone controller 10.

When the forced drive/stop unit 38 functions and the operation of the zone is corrected, the history recording unit 50 records the history. That is, when the correction operation is executed, the history recording unit 50 records the situations before and after the correction.

Next, the operation of the conveyance device 1 will be described.

In the conveyance device 1 of the present embodiment, the object is placed on the first zone as the start position. A barcode (not illustrated) or the like is attached to the object.

The barcode attached to the object is read by the object identifying device 45, and a signal therefrom is sent to the host control device 46.

The host control unit specifies an object from the information described in the barcode, inquires of the conveyance destination (destination place) of the object, transmits the address of the destination place to the zone controller 10 of the second zone, and inputs the address to the conveyance destination storage member 47 of the zone controller 10 of the second zone.

On the other hand, when the object is placed in the first zone, the load presence sensor ON is turned on in the first zone. When there is no object in the second zone, the zone controller of the first zone is driven because the drive condition is satisfied. In addition, the zone controller of the second zone is also driven because the drive condition is satisfied. As a result, the second zone is also driven, and the object is moved from the first zone to the second zone.

The subsequent third zone is also driven because the drive condition is satisfied. The object is moved from the second zone to the third zone.

Here, in the present embodiment, the information on the conveyance destination of the object is also taken over from the second zone to the third zone.

Thereafter, the object is sequentially moved to the downstream side, and information of the conveyance destination is also sequentially sent. Then, the object is moved to a predetermined conveyance destination.

On the other hand, the fact that the object is sequentially moved to the first zone, the second zone, the third zone, and the like is notified to the host control device 46 by the communication network 27, and the movement situation monitoring unit 35 monitors the movement situation of each object and the current operation situation of the conveyance device 1.

When the object stopped and does not move for some reasons, the peripheral information check unit 36 automatically checks the driving state of the zone where the object is placed and the zones before and after the zone as well as the presence or absence of the object (hereinafter, situation check operation). For example, when it is detected that the object remains in the same zone for a certain period of time, the situation check operation is automatically executed.

As a result, when the object may be moved, the forced drive/stop unit 38 sends a signal to a stopped zone and a zone on the downstream side thereof to forcibly drive the zone (hereinafter, forced drive operation). That is, even when the drive condition is not satisfied, the stopped zone and the zone on the downstream side thereof are forcibly driven by the signal from the forced drive/stop unit 38.

When the stopped zone and the zone on the downstream side thereof are forcibly driven by the host control device 46, the situations before and after the correction are recorded by the history recording unit 50.

Even when the objects reach the zones before the merging portion at the same time and the two objects stop and do not move in this state, if the conveyance units in the two zones are driven at the same time, the objects collide at the merging portion.

In the present embodiment, as unit for avoiding collision, the conveyance order storage unit 48 and the priority order determination unit 58 are provided in the host control device 46.

The conveyance order storage unit 48 stores the order in which the objects are to be conveyed.

When the objects reach the zones before the merging portion at the same time and the two objects stop and do not move in this state, the preceding object stored in the conveyance order storage unit 48 is carried into the merging portion first.

The priority order determination unit 58 issues, to the merging portion and the conveyance unit before the merging portion, a command to introduce one of the objects to the merging portion and to subsequently carry the other object to the merging portion regardless of the destination of the object and the conveyance order.

When the objects reach the zones before the merging portion at the same time and the two objects stop and do not move in this state, if the conveyance order of the objects is stored in the conveyance order storage unit 48, the object that precedes in the conveyance order is carried into the merging portion first according to the command from the host control device 46.

When the conveyance order of the object is not stored in the conveyance order storage unit 48, the conveyance units are driven in the order determined by the priority order determination unit 58 according to the command from the host control device 46.

In addition, in the present embodiment, separately from the movement of each zone controller, the movement path of the object is determined by the movement path estimation unit 33 of the host control device 46, and the conveyance path is stored for each object.

Furthermore, in the present embodiment, the movement situation monitoring unit 35 monitors the driving state of each zone, and predicts the zones to which the individual objects will move next. Then, the path comparison unit 37 compares the direction in which the object will move next with the path determined by the movement path estimation unit 33.

Here, due to the communication between the adjacent zones, the conveyance destination based on the information of the conveyance destination that has been sequentially sent and a discharge destination according to the record of the movement path estimation unit 33 might be different depending on some reasons.

When the conveyance destination and the discharge destination are different from each other, a signal is sent to the zone where the object is placed and the zones on the downstream side thereof by the forced drive/stop unit 38, and the zone is forcibly stopped or driven. That is, the movement destination is corrected by the signal from the forced drive/stop unit 38.

When the conveyance destination of the object is corrected by the host control device 46, the situations before and after the correction are recorded by the history recording unit 50.

Hereinafter, the above-described functions will be specifically described.

Figure 5A:
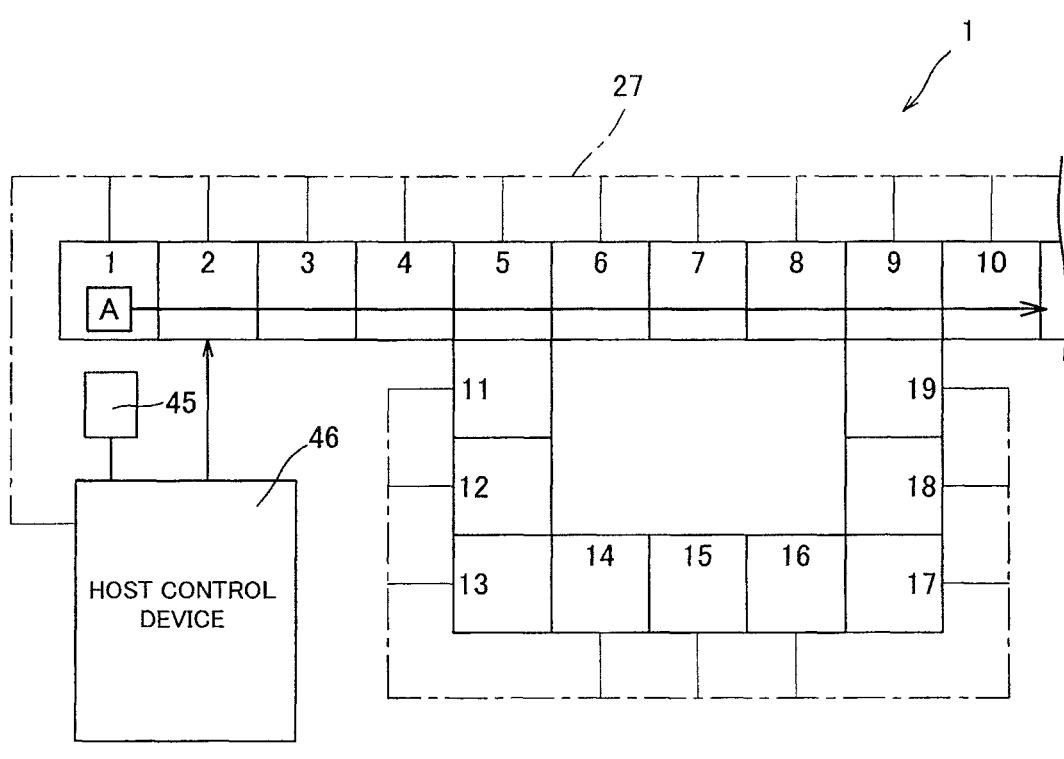
FIG. 5A is an explanatory view illustrating a conveyance path of an object A.
Figure 5B:
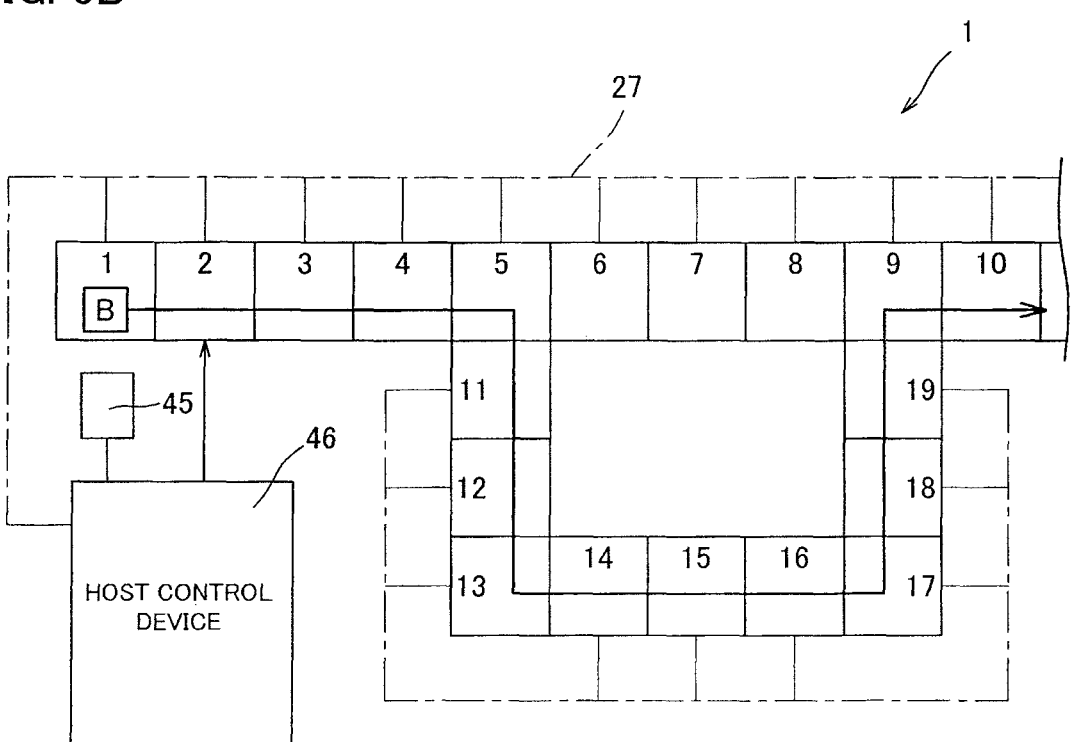
FIG. 5B is an explanatory view illustrating a conveyance path of an object B.

FIG. 5A illustrates an original conveyance path of the object A. That is, the object A is an object to be linearly conveyed from the first zone to the 10th zone. FIG. 5B illustrates an original conveyance path of the object B. That is, the object B is an object that should reach from the 11th zone to the 19th zone by changing the course in the fifth zone, and merge into the linear portion in the ninth zone.

When the downstream zones of the current zone are in an empty state, the object A is moved from the first zone to the 10th zone without stopping as indicated by an arrow in FIG. 5A.

Figure 6A:
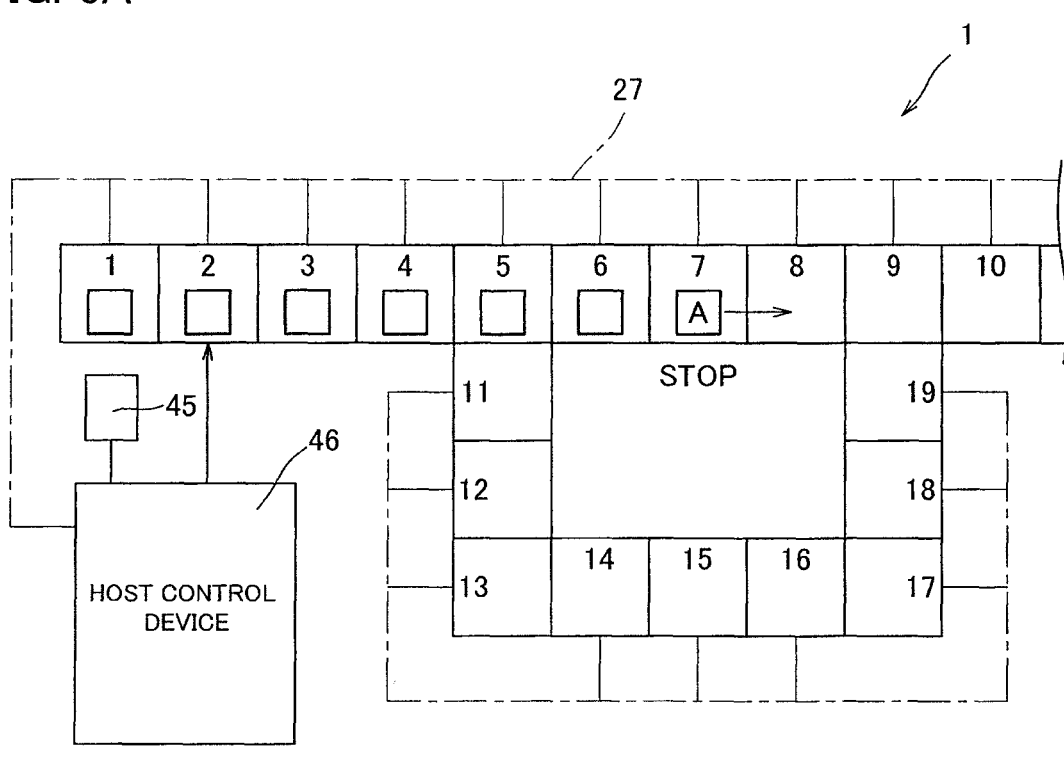
FIG. 6A is an explanatory view illustrating a state in which the object A has stopped in a zone 7 and did not move.

However, as illustrated in FIG. 6A, for example, the object A may stop in the seventh zone and might not move any more.

When the movement situation monitoring unit 35 detects that such a situation has occurred and the state has continued for a certain period of time, the peripheral information check unit 36 performs the situation check operation to check whether there is an object in the eighth zone which is downstream of the seventh zone where the object is placed.

Figure 6B:
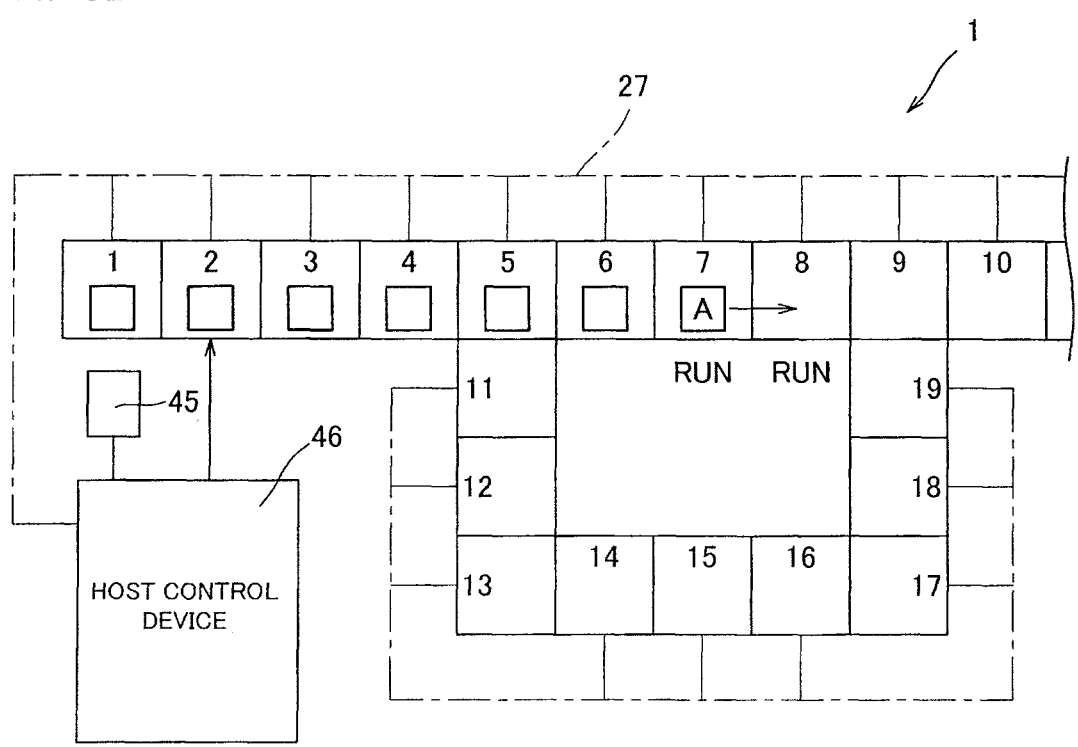
FIG. 6B is an explanatory view illustrating a state in which the stop is forcibly released.

When there is no object in the eighth zone on the downstream side as illustrated in FIG. 6A, a signal is sent from the forced drive/stop unit 38 of the host control device 46 to the seventh zone that has stopped and the eighth zone on the downstream side of the seventh zone as illustrated in FIG. 6B, and the zones are forcibly driven. That is, even when the correction operation is executed and the drive condition is not satisfied, the seventh zone and the eighth zone are driven by the signal from the forced drive/stop unit 38, and the object A moves to the downstream side.

As described above, the object A is an object to be linearly conveyed from the first zone to the 10th zone.

Therefore, when the object A reaches the fifth zone, the sixth zone on the downstream side of the fifth zone is driven, and the 11th zone of a detour has to be stopped.

Figure 7A:
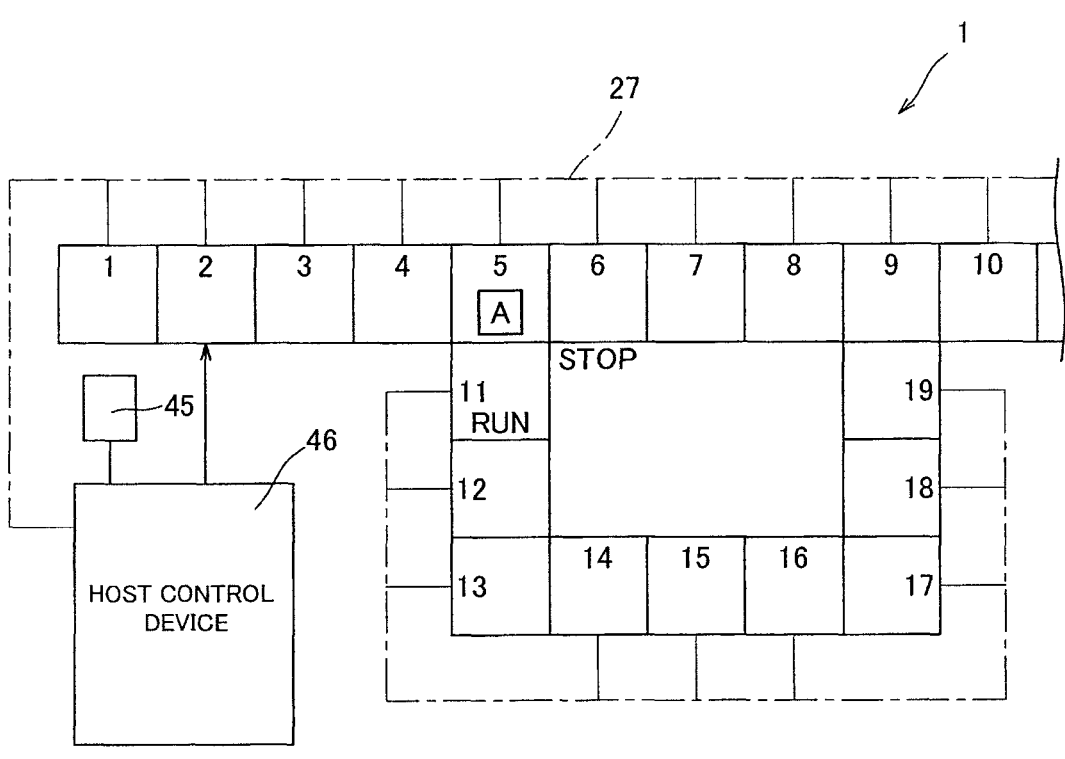
FIG. 7A is an explanatory view illustrating a state in which the object A is about to deviate from the original conveyance path.

However, as illustrated in FIG. 7A, for example, when the object A reaches the fifth zone, there is a case where the sixth zone where the object A should proceed is stopped and the 11th zone where the object should not proceed is driven.

When the movement situation monitoring unit 35 detects that such a situation has occurred, the peripheral information check unit 36 checks whether there is an object in the sixth zone which is the downstream side of the fifth zone where the object is placed.

Figure 7B:
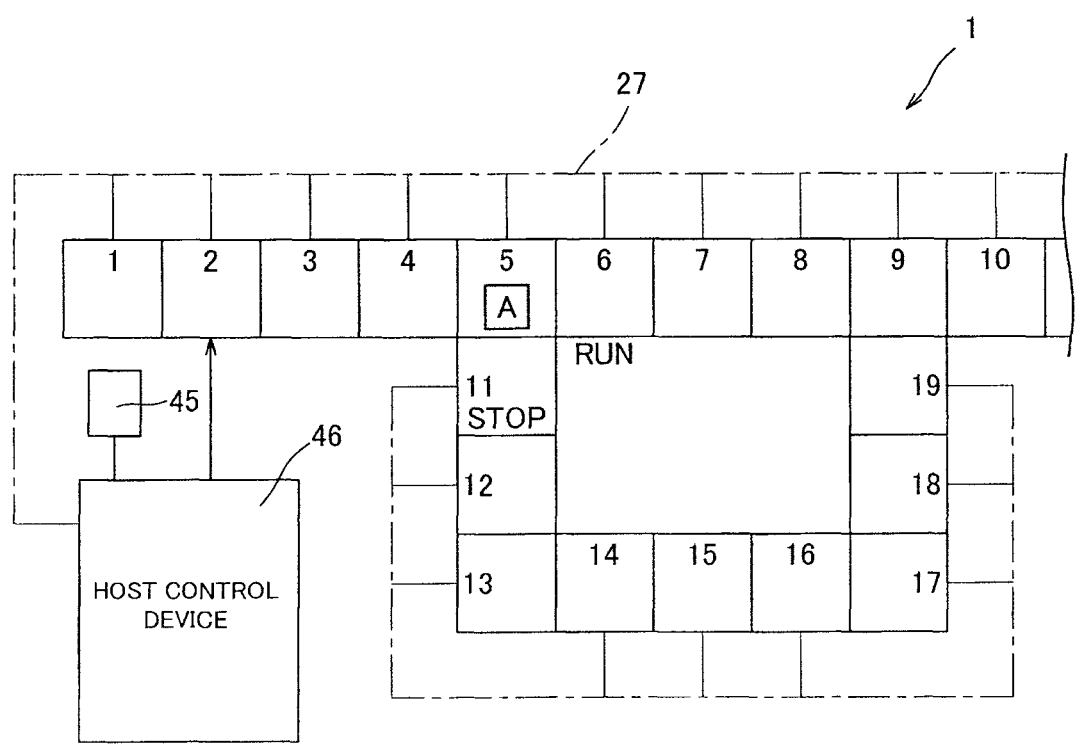
FIG. 7B is an explanatory view illustrating a state in which the conveying path is corrected.

When there is no object in the sixth zone which is the downstream side as illustrated in FIG. 7A, a signal is sent to the sixth zone which is the downstream zone and the 11th zone which is the detour, so that the sixth zone is driven and the 11th zone is stopped by the forced drive/stop unit 38 as illustrated in FIG. 7B. That is, even when the drive condition is not satisfied, the sixth zone is driven by the signal from the forced drive/stop unit 38 of the host control device 46. Even when the drive condition is satisfied, the 11th zone is stopped by the signal from the forced drive/stop unit 38.

In the conveyance device 1 illustrated in FIG. 1, there are a linear path traveling in the fifth, sixth, seventh, eighth, and ninth zones, and a detour traveling in the fifth, 11th, 12th, . . . , and ninth zones, and the ninth zone is the merging portion.

Figure 8A:
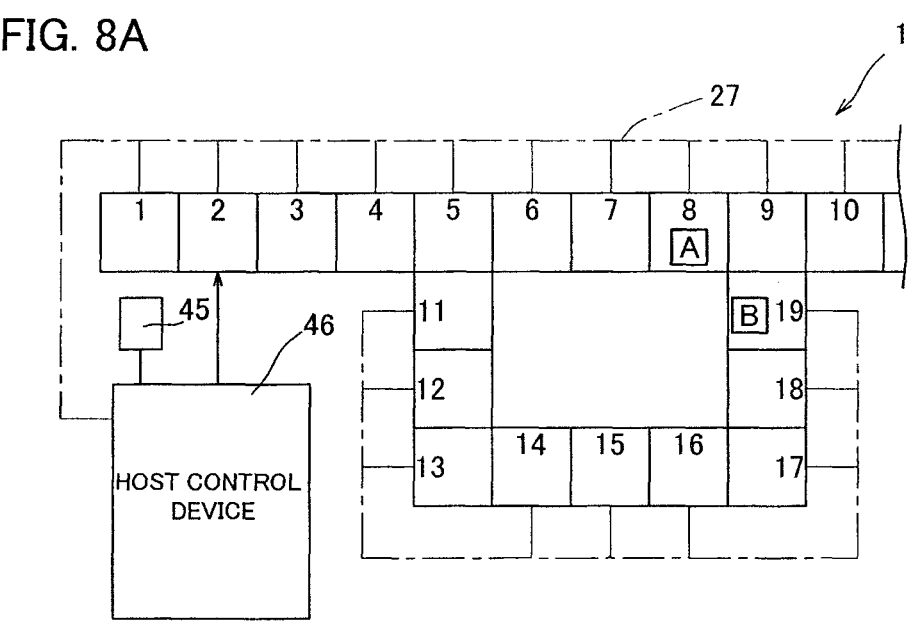
FIG. 8A is an explanatory view illustrating a state in which the object A and the object B are stopped before a merging portion and are not moved.

As illustrated in FIG. 8A, when the object A and the object B arrive at the eighth and 19th zones before the merging portion at the same time, although programming is performed such that one of the objects A and B is sent first, the conveyance device 1 might be stopped in the state illustrated in FIG. 8A.

When the movement situation monitoring unit 35 detects that such a situation has occurred, the peripheral information check unit 36 checks whether there is an object in the ninth zone which is the downstream side of the eighth and 19th zones where the objects are placed.

When there is no object in the ninth zone on the downstream side as illustrated in FIG. 8A, the preceding object stored in the conveyance order storage unit 48 is carried into the merging portion first.

Figure 8B:
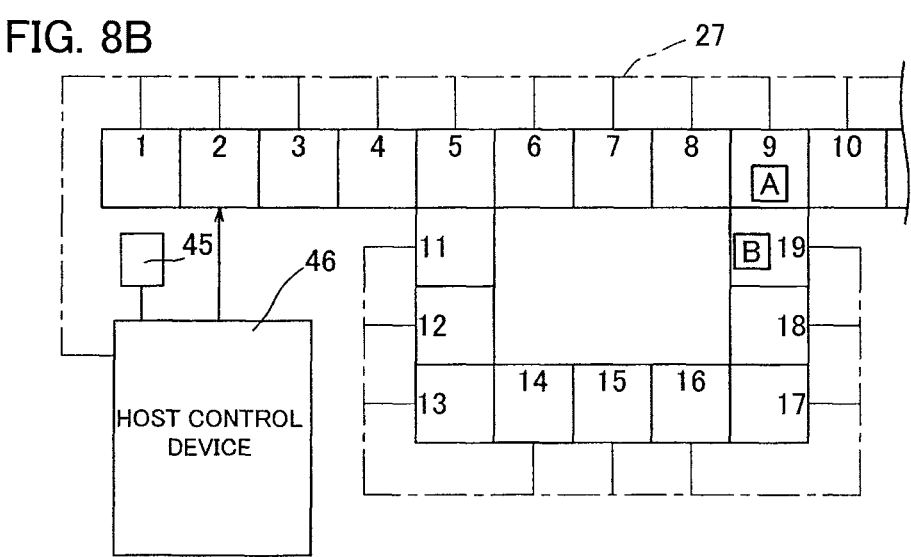
FIGS. 8B and 8C are explanatory diagrams illustrating a state in which the stop is forcibly released.

For example, it is assumed that the object A is intended to pass first, and a signal is sent to the eighth zone where the object A has stopped and the ninth zone on the downstream side of the eighth zone, so that the zones are forcibly driven by the forced drive/stop unit 38 as illustrated in FIG. 8B. That is, even when the drive condition is not satisfied, the eighth zone and the ninth zone are driven by the signal from the forced drive/stop unit 38, and the object A moves to the downstream side.

Subsequently, a signal is sent to the 19th zone where the object B has stopped and the ninth zone on the downstream side of the 19th zone, and the zones are forcibly driven. That is, even when the drive condition is not satisfied, the 19th zone and the ninth zone are driven by the signal from the forced drive/stop unit 38, and the object B moves to the downstream side.

When the conveyance order of the object is not stored in the conveyance order storage unit 48, the conveyance units are driven in the order determined by the priority order determination unit 58 according to the command from the host control device 46.

For example, a signal is sent to the eighth zone and the ninth zone on the downstream side of the eighth zone, and the zones are forcibly driven.

Figure 8C:
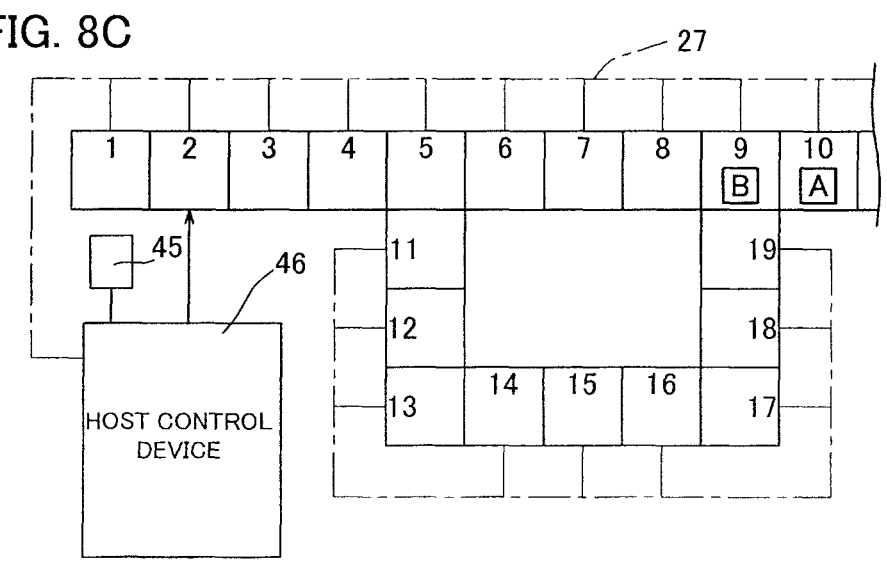

When the correction operation described with reference to FIGS. 6, 7, and 8 is executed, the history recording unit 50 records the situations before and after the correction. Therefore, it is possible to verify the cause of the occurrence of the malfunction.

In the embodiment described above, the host control device 46 includes the movement situation monitoring unit 35, and the current position and the movement situation of each object are monitored by the movement situation monitoring unit 35. When the conveyance unit on which the object is placed has stopped even in a situation where the object is movable on the basis of the state around the object, the forced drive operation is executed to discharge the object from the zone.

In the embodiment described above, the current position and the movement situation of each object are monitored. However, the overall movement of the conveyance device 1 is monitored in a bird's eye view, and when there is a malfunction, the drive condition of the zone may be temporarily changed.

For example, there is no branching unit in the first zone to the fourth zone in FIG. 1. Therefore, when the object is carried into the first zone, the object should be carried into the fourth zone without delay.

Since the conveyance device 1 of the present embodiment adopts a distributed control system, the first zone to the fourth zone are normally stopped, and only the zone satisfying the drive condition is driven.

However, for example, there is a malfunction in the load presence sensor S, and the object might be stagnated in a specific zone. In such a case, it is also recommended to change the drive condition itself of the zone.

Hereinafter, this configuration will be described.

Figure 9:
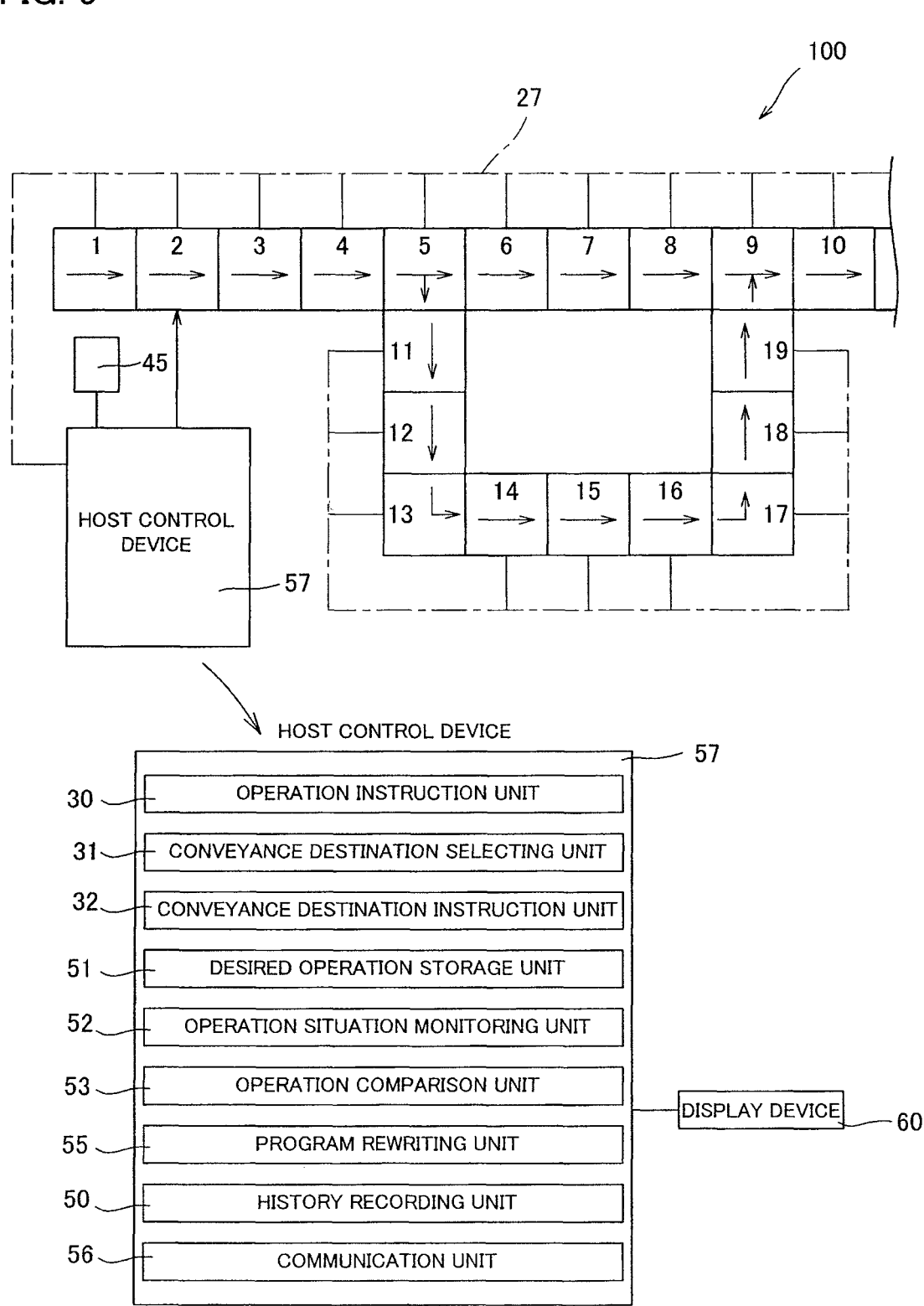
FIG. 9 is a block diagram of a layout of the conveyor device and the host control device according to a second embodiment of the present invention.

As illustrated in FIG. 9, a host control device 57 adopted in a conveyance device 100 of the present embodiment includes the operation instruction unit 30, the conveyance destination selecting unit 31, the conveyance destination instruction unit 32, a desired operation storage unit 51, an operation situation monitoring unit 52, an operation comparison unit 53, a program rewriting unit 55, the history recording unit 50, and the communication unit 56.

Here, the functions of the operation instruction unit 30, the conveyance destination selecting unit 31, the conveyance destination instruction unit 32, the history recording unit 50, and the communication unit 56 are the same as those in the above-described embodiment.

In the present embodiment, a desired operation of the conveyance device 100 is stored in the desired operation storage unit 51. For example, as described above, it is stored as a desired operation that the object is carried into the fourth zone without delay when the object is carried into the first zone.

The operation situation monitoring unit 52 monitors the operation situation of each zone from information obtained by the communication unit 56.

The operation comparison unit 53 compares the current operation situation of the conveyance device 100 obtained by the operation situation monitoring unit 52 with the desired operation of the conveyance device 100 stored in the desired operation storage unit 51.

As a result of the comparison, when there is a prescribed difference between the operation situation and the desired operation, the program of the zone controller 10 is rewritten or replaced by the program rewriting unit 55, and an operation close to the desired operation is executed in preference to the individual program so far.

For example, even though the load presence sensor is turned off in a zone on the downstream side of a specific zone, the load presence sensor may not be turned off in the zone, and even though the load presence sensor is turned on in a zone on the upstream side of the zone, the upstream zone remains stopped. Such a state can be detected by the operation situation monitoring unit 52.

The above-described situation is different from the desired operation of the conveyance device 100 stored in the desired operation storage unit 51 by a certain amount or more.

In such a case, the program of the zone controller 10 is changed by the program rewriting unit 55.

For example, the control logic in which the drive motor 15 (drive device) of the own zone is activated when the condition that the load presence sensor is turned on in the own zone and the load presence sensor is turned off in the downstream zone is satisfied in the individual program so far is changed to a program for constantly rotating the drive motor 15. Alternatively, the start and stop of the drive motor 15 is changed to a program for corresponding to the preceding and subsequent zones.

As a result, the operation of the conveyance device 100 becomes close to the desired operation.

A rough example such as "when the object is carried into the first zone, the object is carried into the fourth zone without delay" has been described as the desired operation stored in the desired operation storage unit 51 described above, but the desired operation may be more detailed and specific.

For example, software (simulation software) for faithfully simulating the operation of the conveyance device 100 may be used to assume the desired operation of the conveyance device 100 by moving the object A or the object B on the software, and the desired operation may be stored in the desired operation storage unit 51.

Although not limited, the simulation software stores the layout of the conveyance device 100, the length of each zone, the mechanical structure, the rotational speed of the drive motor, the generated torque, the position of the load presence sensor, and the like. In addition, the simulation software also stores the control circuit 40 of the zone controller 10, the individual program, various settings, and the like, and the operations of the conveyance devices 1, 100 can be faithfully realized in the virtual space.

For example, a large number of objects including the object A and the object B are simultaneously conveyed by the conveyor device on a virtual space of the simulation software, the desired operation of the conveyance device 100 is executed on the virtual space, and the situation at that time is stored in the desired operation storage unit 51.

Then, the current operation situation of the conveyance device 100 obtained by the operation situation monitoring unit 52 is compared with the desired operation of the conveyance device 100 stored in the desired operation storage unit 51, and when there is a certain difference or more between the operation situation and the desired operation, the program of the zone controller 10 is changed by the program rewriting unit 55.

Figure 10:
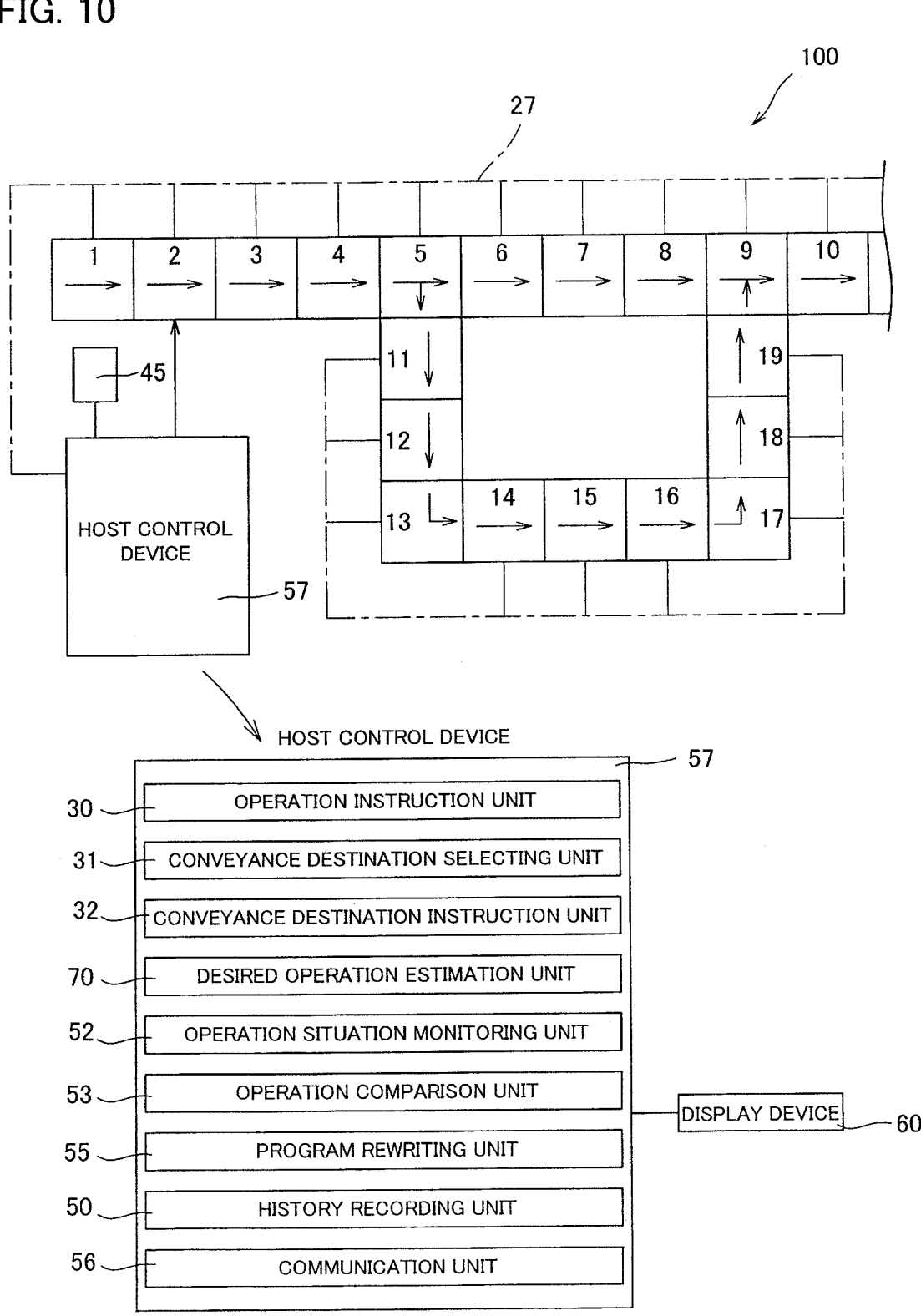
FIG. 10 is a block diagram of a layout of the conveyor device and the host control device according to a third embodiment of the present invention.

In the embodiment described above, the operation executed by the simulation software is stored in the desired operation storage unit 51. However, as illustrated in FIG. 10, a desired operation estimation unit 70 equipped with the simulation software may be provided in the host control device 57, and the conveyance device 100 may be operated on the virtual space simultaneously in parallel with the actual conveyance device 100, and when there is a certain or more difference between the conveyance devices 100, the program of the zone controller 10 may be changed by the program rewriting unit 55.

The desired operation estimation unit 70 operates the conveyance device 100 on the virtual space independently of the actual conveyance device 100, and virtually moves the object.

On the virtual space, a virtual load presence sensor is turned on and off and input to each zone controller on the virtual space, the drive motor on the virtual space is controlled, and the object on the virtual space is moved.

The simulation software and the desired operation estimation unit 70 can also be adopted in the embodiment illustrated in FIG. 1.

That is, the desired operation estimation unit 70 is adopted in place of the peripheral information check unit 36 or in addition to the peripheral information check unit 36, and when it is detected that the object remains in the same zone for a certain period of time, the desired operation estimation unit 70 checks whether there is an object in the surrounding zones. Assuming that the conveyance device 1 is operated normally so far, the desired operation estimation unit 70 can estimate the driving state of the zone where the object is placed, the driving states of the zones before and after the zone, and the presence or absence of the object.

Alternatively, the actual movement situation of each object checked by the movement situation monitoring unit 35 may be compared with the virtual movement situation estimated by the desired operation estimation unit 70 or the simulation software.

EXPLANATION OF REFERENCE NUMBERS

1: Conveyance device
10: Zone controller (individual control device)
15: Drive motor (drive device)
20: Conveyance unit
30: Operation instruction unit
31: Conveyance destination selecting unit
32: Conveyance destination instruction unit
33: Movement path estimation unit
35: Movement situation monitoring unit
36: Peripheral information check unit
37: Path comparison unit
38: Forced drive/stop unit
40: Control circuit
41: Transmission and reception unit
42: Drive circuit
46, 57: Host control device
47: Conveyance destination storage member
48: Conveyance order storage unit
50: History recording unit
51: Desired operation storage unit
52: Operation situation monitoring unit
53: Operation comparison unit
55: Program rewriting unit
58: Priority order determination unit
60: Display device
100: Conveyance device
S: Load presence sensor

The invention claimed is:

1. A conveyance device including a plurality of conveyance units connected to form a conveyance path,
the plurality of conveyance units each comprising:
a drive device driving the conveyance unit; and
an individual control device controlling the conveyance unit, the individual control device allowing the drive device to drive the conveyance unit when a specific drive condition is satisfied,
the conveyance device comprising a host control device communicating with the individual control device,
the host control device comprising a movement situation monitoring unit monitoring a movement situation of an actual object on the conveyance path,
wherein when the conveyance unit having an specific object thereon is stopping even though surrounding conditions of the specific object show that the specific object is movable, a correction operation is executed regardless of the drive condition, the correction operation driving the conveyance unit according to a command from the host control device.

2. The conveyance device according to claim 1,
wherein the individual control devices exchange information on a destination of an object between each other to convey the object to a predetermined conveyance destination,
wherein the host control device includes a movement path estimation unit that estimates a movement path of an object, and
wherein when a specific object is about to deviate from the movement path estimated by the movement path estimation unit, a correction operation is executed in preference to the information on the destination exchanged between the individual control devices, the correction operation guiding the object to a path estimated by the movement path estimation unit.

3. A conveyance device including a plurality of conveyance units connected to form a conveyance path, the plurality of conveyance units each comprising:

a drive device driving the conveyance unit; and an individual control device controlling the conveyance unit, the individual control device allowing the drive device to drive the conveyance unit when a specific drive condition is satisfied, the individual control devices exchanging information on a destination of the object between each other to convey the object to a predetermined conveyance destination, the conveyance device comprising a host control device communicating with the individual control devices, the host control device comprising:

a movement path estimation unit estimating a movement path of the object; and a movement situation monitoring unit monitoring a movement situation of an actual object on the conveyance path, wherein when a specific object is about to deviate from the movement path estimated by the movement path estimation unit, a correction operation is executed in preference to the information on the destination exchanged between the individual control devices, the correction operation guiding the object to a path estimated by the movement path estimation unit.

4. A conveyance device including a plurality of conveyance units connected to form a conveyance path, the plurality of conveyance units each comprising:

a drive device driving the conveyance unit; and an individual control device storing an individual program for operating the conveyance unit according to a predetermined operation logic, the conveyance device comprising a host control device communicating with the individual control device, the host control device comprising:

an operation situation monitoring unit individually monitoring an operation state of each conveyance unit; and at least one of a desired operation storage unit storing a desired operation of the conveyance device and a desired operation estimation unit virtually executing a desired operation of the conveyance device, wherein when there is a prescribed difference in comparison of the desired operation of the conveyance device with an actual operation of the conveyance device obtained by the operation situation monitoring unit, a correction operation is executed in preference to the individual program, the correction operation being an operation close to the desired operation.

5. The conveyance device according to claim 1, wherein when any of the correction operations is executed, a situation at the execution of the correction operation is recorded.

6. The conveyance device according to claim 1, wherein any of the conveyance units is a roller conveyor, and wherein a tangential force of the roller is 100 newtons or less.

7. The conveyance device according to claim 1, wherein the conveyance device includes a merging portion where a plurality of conveyance paths merge, and wherein when each conveyance unit before the merging portion has an object at the same time, a priority order of which conveyance unit to bring its object into the merging portion is determined in advance.

8. The conveyance device according to claim 1, wherein the host control device stores a conveyance order of each object.

9. The conveyance device according to claim 3, wherein when any of the correction operations is executed, a situation at the execution of the correction operation is recorded.

10. The conveyance device according to claim 3, wherein any of the conveyance units is a roller conveyor, and wherein a tangential force of the roller is 100 newtons or less.

11. The conveyance device according to claim 3, wherein the conveyance device includes a merging portion where a plurality of conveyance paths merge, and wherein when each conveyance unit before the merging portion has an object at the same time, a priority order of which conveyance unit to bring its object into the merging portion is determined in advance.

12. The conveyance device according to claim 3, wherein the host control device stores a conveyance order of each object.

13. The conveyance device according to claim 4, wherein when any of the correction operations is executed, a situation at the execution of the correction operation is recorded.

14. The conveyance device according to claim 4, wherein any of the conveyance units is a roller conveyor, and wherein a tangential force of the roller is 100 newtons or less.

15. The conveyance device according to claim 4, wherein the conveyance device includes a merging portion where a plurality of conveyance paths merge, and wherein when each conveyance unit before the merging portion has an object at the same time, a priority order of which conveyance unit to bring its object into the merging portion is determined in advance.

16. The conveyance device according to claim 4, wherein the host control device stores a conveyance order of each object.

* * * * *